United States Patent
Frahm et al.

(10) Patent No.: US 9,909,011 B2
(45) Date of Patent: Mar. 6, 2018

(54) METHOD FOR COATING THE SURFACE OF INORGANIC SOLID PARTICLES, ESPECIALLY TITANIUM DIOXIDE PIGMENT PARTICLES

(75) Inventors: Heiko Frahm, Leverkusen (DE); Joerg Friedrich, Leichlingen (DE); Mark Kaminski, Leverkusen (DE); Erwin Schmeier, Engelskirchen (DE); Lydia Drews-Nicolai, Cologne (DE); Volker Juergens, Kirchhundem (DE)

(73) Assignee: Kronos International, Inc., Leverkusen (DE)

( * ) Notice: Subject to any disclaimer, the term of this patent is extended or adjusted under 35 U.S.C. 154(b) by 1790 days.

(21) Appl. No.: 12/472,498

(22) Filed: May 27, 2009

(65) Prior Publication Data
US 2009/0297852 A1 Dec. 3, 2009

Related U.S. Application Data

(60) Provisional application No. 61/058,270, filed on Jun. 3, 2008.

(30) Foreign Application Priority Data

Jun. 2, 2008 (DE) .................. 10 2008 026 300

(51) Int. Cl.
C09C 1/36 (2006.01)
(52) U.S. Cl.
CPC ........ *C09C 1/3684* (2013.01); *C01P 2004/04* (2013.01); *C01P 2006/60* (2013.01); *Y10T 428/2991* (2015.01)

(58) Field of Classification Search
USPC ........ 427/212, 214, 215, 218, 221; 106/436, 106/442, 446, 437
See application file for complete search history.

(56) References Cited

U.S. PATENT DOCUMENTS

| 2,885,366 A | 5/1959 | Iler |
| 3,640,744 A | 2/1972 | Dietz et al. |

(Continued)

FOREIGN PATENT DOCUMENTS

| EP | 0130272 | 2/1984 |
| EP | 0711606 | 11/1995 |

(Continued)

*Primary Examiner* — John Goff
(74) *Attorney, Agent, or Firm* — Locke Lord, LLP

(57) ABSTRACT

A method for coating the surface of inorganic solid particles in an aqueous suspension, particularly for coating titanium dioxide with $SiO_2$ includes:
a) disagglomeration of the solid particles contained in aqueous suspension,
b) addition of a water-soluble precursor of the coating substance to the suspension,
c) immediately following step b) homogenization of the suspension, where the temperature and pH value of the suspension do not change significantly in steps a) to c),
d) feeding the slurry into a tank and precipitation of the coating substance onto the particle surface and, optionally, application of further coatings, and
e) separation of the solid particles from the suspension.
The method produces to a highly homogeneous and continuous skin on the particle surface, and to less separately precipitated coating substance.

18 Claims, 2 Drawing Sheets

(56) References Cited

U.S. PATENT DOCUMENTS

| | | | |
|---|---|---|---|
| RE27,818 E | | 11/1973 | Werner |
| 4,199,370 A | * | 4/1980 | Brand ............................ 106/446 |
| 5,340,393 A | * | 8/1994 | Jacobson ....................... 106/492 |
| 5,356,470 A | * | 10/1994 | Ott et al. ....................... 106/437 |
| 5,653,793 A | * | 8/1997 | Ott et al. ....................... 106/437 |
| 5,993,533 A | | 11/1999 | Diebold et al. |
| 2008/0141905 A1 | | 6/2008 | Juergens et al. |

FOREIGN PATENT DOCUMENTS

| | | |
|---|---|---|
| GB | 1179171 | 1/1970 |
| GB | 1340045 | 12/1973 |
| WO | WO 93/22386 | 11/1993 |
| WO | WO 2006/057993 | 6/2006 |

* cited by examiner

METHOD FOR COATING THE SURFACE OF INORGANIC SOLID PARTICLES, ESPECIALLY TITANIUM DIOXIDE PIGMENT PARTICLES

RELATED APPLICATIONS

This application claims the benefit of U.S. Provisional Patent Application Ser. No. 61/058,270 filed Jun. 3, 2008, and entitled "Method for Coating the Surface of Inorganic Solid Particles Especially Titanium Dioxide Pigment Particles" and the benefit of DE 10 2008 026 300.1 filed Jun. 2, 2008.

TECHNICAL FIELD OF THE INVENTION

This invention relates to a method for coating the surface of inorganic solid particles in an aqueous suspension. It especially relates to the coating of titanium dioxide pigment particles with a smooth, homogeneous silicon dioxide skin.

BACKGROUND OF THE INVENTION

The surface of fine, inorganic solid particles is frequently coated in order to modify specific properties, such as abrasion resistance, surface charge, dispersing properties, acid or light resistance. For example, U.S. Pat. No. 2,885,366 describes the application of a dense silicon dioxide coating to substrate particles, such as nickel or iron powder, glass fibers or titanium dioxide. Color and white pigments are regularly coated with various oxides and hydroxides (e.g. EP 0 130 272 A1 and Re. 27,818).

Surface treatment, particularly of $TiO_2$ pigments, is customarily performed in the aqueous phase, where metal oxides, hydroxides, phosphates or similar compounds are deposited on the particle surface. The method is customarily operated as a batch process and starts with an aqueous pigment particle suspension which first of all is disagglomerated, customarily in a media mill. Subsequently, metal salts are added in dissolved form as so-called precursors, and the pH value of the suspension is set by means of alkaline or acidic substances in such a way that the precursors are precipitated as oxides, hydroxides, etc.

In the classical method, there is the risk of particle reagglomeration in the suspension, meaning that the deposited coating substances do not enclose the individual particle, but often an agglomerate. The agglomerates are disintegrated again during final dry milling, as a result of which not all particles in the end product are provided with a continuous skin, but instead also display uncoated surface areas. Moreover, part of the coating substances is not fixed on the particle surface, but forms floccules alongside the particles. These floccules can no longer be removed from the suspension and have a negative impact on the optical properties of the pigments, such as the tinting strength (TS).

U.S. Pat. No. 5,993,533 discloses a method in which titanium dioxide pigment is coated with $SiO_2$ and $Al_2O_3$ in an inline mixer. Treatment is performed in two consecutive maturation stages at 80 to 100° C. and pH values of >9.5 and <8.5.

GB 1 340 045 describes a batch method for coating the surface of titanium dioxide pigment, where a suspension of the pigment is subjected to intensive agitation in a mixing vessel for up to two hours, during which time the coating substances are added and applied.

US 2008/0141905 A1 describes a further method, in which inorganic particles are surface-coated during continuous feeding through an agitator mill. Particularly smooth and homogeneous surface-coating of the individual particles is achieved in this case.

SUMMARY OF THE INVENTION

A method for producing a smooth, homogeneous and continuous surface coating on solid particles and for coating inorganic solid particles in an aqueous suspension with at least one coating substance is provided. The method includes:
a) disagglomeration of the solid particles contained in aqueous suspension,
b) addition of a water-soluble precursor of the coating substance to the suspension,
c) immediately following Step b) homogenization of the suspension, where the temperature and pH value of the suspension do not change significantly in Steps a) to c),
d) feeding the slurry into a tank and precipitation of the coating substance onto the particle surface and, optionally, application of further coatings, and
e) separation of the solid particles from the suspension.

The subject matter of the invention is thus a method for coating the surface of solid particles with a smooth, homogeneous and continuous skin consisting of at least one inorganic or organic compound.

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENTS

Figure 1:
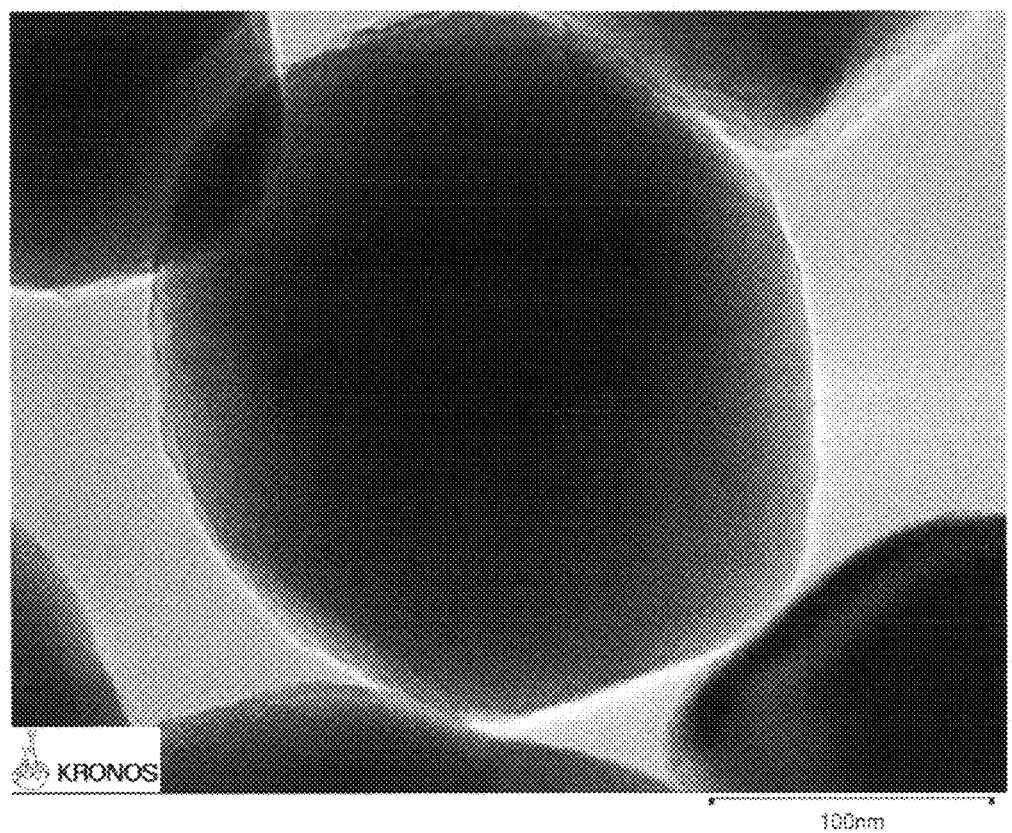
FIG. 1 is an electron microscope image of particles coated using the present method.

The method according to the invention is based on an aqueous suspension of untreated inorganic solid particles, also referred to as base material below. Suitable for this purpose are fine, inorganic solids that have a particle size in the range of about 0.001 to 1 µm and are processed in aqueous suspensions, such as pigments (titanium dioxide, color pigments, effect pigments, etc.), fillers, titanates, iron, nickel or other magnetic particles.

Coatings may also include, for example, oxides, hydroxides, phosphates and similar compounds of the familiar elements Si, Ti, Al, Zr, Sn, Mn, Ce and other elements. As used herein, the term "oxide" is also to be taken to mean the respective hydroxide or hydrous oxide. In particular, inorganic coatings are involved.

In an embodiment of the invention, untreated titanium dioxide pigment particles ($TiO_2$ base material) are used. $TiO_2$ base material manufactured by either the sulphate process or the chloride process can be used. The $TiO_2$ base material can have an anatase or rutile structure. Rutile is preferred. The $TiO_2$ base material is customarily doped with familiar elements, e.g. Al, to improve the photostability of the $TiO_2$ pigment. In the chloride process, for example, such a quantity of $AlCl_3$ is oxidized together with $TiCl_4$ that the $TiO_2$ base material contains about 0.5 to 2.0% by weight Al, calculated as $Al_2O_3$. When manufacturing titanium dioxide by the sulphate process, the hydrolysed titanyl sulphate is mixed with calcining additives, such as potassium hydroxide or phosphoric acid, and subsequently calcined. $TiO_2$ base material from the sulphate process customarily contains about 0.2 to 0.3% by weight K, as well as 0.05 to 0.4% by weight P, calculated as oxide in each case.

The method according to the invention is characterized by the fact that the particles are in an optimum state of dispersion during surface-coating in the aqueous suspension. The method is thus based on an aqueous suspension of untreated, inorganic solid particles that are subjected to intensive disagglomeration in a first step (Step a)).

Disagglomeration can, for example, be performed in agitator mills, such as bead mills or sand mills, or in ultrasonic mills.

A dispersant is customarily added. Suitable dispersants are familiar to the person skilled in the art. For example, sodium silicate or sodium hexametaphosphate is used with preference as the dispersant when disagglomerating $TiO_2$ base material in sand mills. The dispersant concentration is customarily in the range from 0.05 to 5.0 kg/t $TiO_2$.

The pH value of the suspension is customarily also set as a function of the particle type and the dispersant. For example, the pH value is set to values of about 9 to 12, or of about 2 to 5, when disagglomerating $TiO_2$ base material from the chloride process. The temperature of $TiO_2$ base material suspensions is customarily about 40 to 80° C.

The disagglomerated suspension is classified to eliminate grinding media, their fragments or feedstock which has not been comminuted adequately. Sieves and hydrocyclones are used for this purpose. The fines from hydrocyclone classification can subsequently be used for surface-coating, while the coarse material can be returned to the disagglomeration process step.

In a Step b), a precursor of the coating substances is added to the suspension in an aqueous solution, customarily, as in the classical methods, in the form of water-soluble salts (referred to as metal salts below). The person skilled in the art is familiar with the corresponding metal salts. For example, sodium or potassium silicate (waterglass) can be used as the precursor for coating with $SiO_2$.

Furthermore, organometallic compounds can also be used as precursors, such as alkoxysilanes for coating with $SiO_2$. The precursor can be added either to a pipeline or batchwise to a tank.

The method according to the invention is characterized in that the addition follows so fast after disagglomeration and classification, that the temperature and pH value cannot change significantly. A "significant" change is taken to mean a temperature difference of more than 10° C. and a pH value difference greater than 1. Addition preferably takes place no later than eight hours preferably no later than one hour after disagglomeration and classification. It is advantageous to avoid sedimentation of the particles in the period prior to addition of the precursor.

Following addition of the precursor, the suspension is homogenized in a dispersing machine in a Step c). Inline dispersing machines are preferably used, such as rotor-stator systems, or static mixers. No significant change in the temperature and pH value of the suspension occurs during homogenization. Homogenization ensures that a uniform, adsorbed layer of the precursor already forms around the individual particles. Precipitation of the coating substance takes place in Step d).

In Step d), the suspension is fed into a tank and the coating substance precipitated on the particle surface by setting a suitable pH value. Accordingly, an acid or alkaline-reacting substance, such as an acid or a lye, is added to the suspension in accordance with familiar methods. The person skilled in the art is familiar with the precipitation conditions for the individual coating substances.

Optionally, further inorganic or organic coatings can additionally be applied to the particle surface by familiar methods.

In a Step e), the coated particles are separated from the suspension, washed if appropriate, dried and fine-ground by familiar methods.

In an embodiment of the method, titanium dioxide base material particles are coated with $SiO_2$ or $Al_2O_3$, preferably with $SiO_2$. To this end, a suspension of $TiO_2$ base material particles is set to an alkaline pH value, mixed with dispersant, disagglomerated in a sand mill and subsequently classified. The suspension subsequently has a pH value of about 9 to 12 and a temperature of about 40 to 80° C.

For coating with $SiO_2$, sodium silicate solution is added to the suspension as the precursor, in a quantity of about 0.1 to 5.0% by weight $SiO_2$, referred to $TiO_2$. For coating with $Al_2O_3$, suitable precursors are, for example, aluminates, particularly sodium aluminate. Addition preferably takes place no later than eight hours preferably no later than one hour after disagglomeration and classification, so that the temperature and pH value have not changed significantly. The suspension mixed with silicate is homogenized in an inline dispersing machine immediately afterwards. The temperature and pH value of the suspension do not change significantly during homogenization.

The suspension is subsequently pumped into a tank and the pH value set to about 1 to 8 by adding an appropriate quantity of acid, such as HCl. As a result, $SiO_2$ or $Al_2O_3$ is precipitated on the particle surface.

Familiar methods can subsequently be used to apply further surface coatings, e.g. oxides, hydroxides, oxide hydrates or phosphates of Si, Al, Zr, Sn, Ti, Mn, Ce, etc. Preferably, an Al compound is finally applied in a quantity of about 0.5 to 8% by weight, calculated as $Al_2O_3$ and referred to $TiO_2$.

Compared to the familiar surface-coating methods, the method according to the invention achieves very smooth, homogeneous and continuous enclosure of the individual particles. Moreover, the suspension of $SiO_2$ or $Al_2O_3$-coated $TiO_2$ particles, produced in Step c) of the method according to the invention, demonstrates particularly good storage stability compared to conventionally disagglomerated and classified suspension, since the silicon dioxide hydrate layer, or the aluminium oxide hydrate layer, on the $TiO_2$ particles increases the negative surface charge density of the particles under the prevailing conditions (temperature of about 40 to 80° C., pH value of about 9 to 12). This prevents reagglomeration of the titanium dioxide during subsequent precipitation in Step d) and prior to further coating. With the method according to the invention, there is less uncoated particle surface and less separately precipitated coating substance following final fine-grinding.

Moreover, the filtration properties of the suspension produced by the method according to the invention compare well to those of the suspension produced by the classical method, see Reference Example 1.

$TiO_2$ pigments treated according to the invention display improved photostability and substantially improved tinting strength (TS). The $TiO_2$ pigments are eminently suited to use in plastics, particularly masterbatches, as well as in coatings, particularly paints, and in laminates.

EXAMPLES

The invention is explained in more detail below on the basis of examples, although these are not to be interpreted as a limitation. The quantities indicated refer to the $TiO_2$ base material in each case.

Example 1

An aqueous suspension of $TiO_2$ base material from the chloride process with a concentration of 550 kg/m$^3$ and a temperature of 55° C. was prepared, set to a pH value of about 11 with NaOH and mixed with sodium hexametaphosphate as dispersant. The suspension obtained in this way was disagglomerated in an agitator mill, using zirconium dioxide grinding media, and classified by means of sieves and hydrocyclones to eliminate coarse material. The fines from the disagglomerated suspension were collected in a tank and displayed a pH value of 10.5 and a temperature of 55° C. The suspension was subsequently fed through an inline dispersing machine (rotor-stator system: Ytron Z250.3). 0.5% by weight aqueous sodium silicate solution, calculated as $SiO_2$ and referred to $TiO_2$, was added to the suspension via a pipe in the feed line of the inline dispersing machine.

The suspension was subsequently collected in a further tank. The temperature of the suspension was 55° C., the pH value being 10.5. HCl was subsequently added while stirring, and the pH value set to about 3.5.

After stirring for 30 minutes, a further 0.7% $SiO_2$ was added in the form of sodium silicate solution, and finally 2.0% $Al_2O_3$ in the form of sodium aluminate solution. A pH value of about 6 was obtained. The suspension was subsequently filtered, washed and dried. The dried material was micronized in a spiral jet mill with added silicone oil.

The composition of the $TiO_2$ pigment was analyzed with the help of XRF (X-ray fluorescence) and was 95% by weight $TiO_2$, 1.25% by weight $SiO_2$ and 3.3% by weight $Al_2O_3$.

Examination under the transmission electron microscope revealed that the pigment displays a very homogeneous, smooth and continuous coating (FIG. 1). There is no flocculated coating material alongside the particles. The tinting strength (TS) of the pigment produced in this way was about 103 points.

Example 2

The procedure was the same as in Example 1, the only difference being that 0.5% by weight $Al_2O_3$ in the form of sodium aluminate solution was added to the feed line of the inline dispersing machine, instead of $SiO_2$. In the further course, $SiO_2$ and $Al_2O_3$ were added in such quantities that a $TiO_2$ pigment was obtained with the composition 96% by weight $TiO_2$, 1.8% by weight $SiO_2$ and 2.2% by weight $Al_2O_3$.

Reference Example 1 (Classical Method)

An aqueous suspension of $TiO_2$ base material from the chloride process with a concentration of 550 kg/m$^3$ and a temperature of 55° C. was prepared, set to a pH value of about 11 with NaOH and mixed with sodium hexametaphosphate as dispersant. The suspension obtained in this way was disagglomerated in an agitator mill, using zirconium dioxide grinding media, and classified by means of sieves and hydrocyclones to eliminate coarse material. The fines from the disagglomerated suspension were collected in a tank and displayed a pH value of 10.5 and a temperature of 55° C.

The suspension was subsequently collected in a tank. The temperature of the suspension was 55° C., the pH value being 10.5.

1.25% $SiO_2$ was then added in the form of sodium silicate solution, the pH value lowered to approx. 5 by adding HCl and, finally, 2.0% $Al_2O_3$ added in the form of sodium aluminate solution. A pH value of about 6 was obtained. The suspension was subsequently filtered, washed and dried. The dried material was micronized in a spiral jet mill with added silicone oil.

Figure 2:
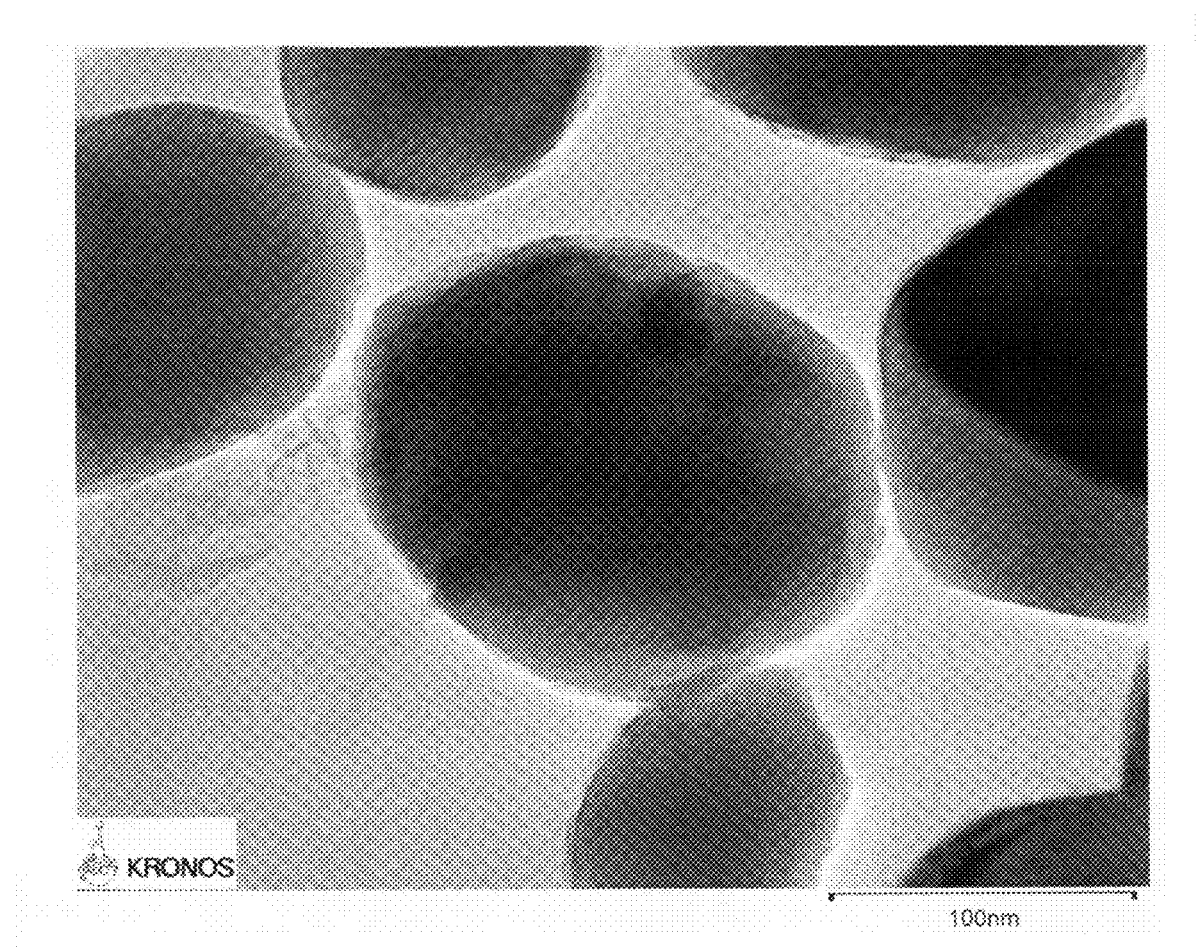
FIG. 2 is an electron microscope image of particles coated using a prior art method.

The composition of the $TiO_2$ pigment was analyzed with the help of XRF (X-ray fluorescence) and was 95% by weight $TiO_2$, 1.25% by weight $SiO_2$ and 3.3% by weight $Al_2O_3$. Examination under the transmission electron microscope (FIG. 2) revealed that the pigment displays an inhomogeneous coating compared to Example 1. There is flocculated coating material alongside the particles. The tinting strength (TS) of the pigment produced in this way was 99 points.

Reference Example 2 (So-Called TDD Method)

An aqueous suspension of $TiO_2$ base material from the chloride process with a concentration of 550 kg/m$^3$ and a temperature of 55° C. was prepared, set to a pH value of about 11 with NaOH and mixed with sodium hexametaphosphate as dispersant. This was followed by addition of 0.5% by weight aqueous sodium silicate solution, calculated as $SiO_2$ and referred to $TiO_2$. The suspension obtained in this way was disagglomerated in an agitator mill, using sand grinding media, and classified by means of sieves and hydrocyclones to eliminate coarse material. The fines from the disagglomerated suspension were collected in a tank and displayed a pH value of 10.5 and a temperature of 55° C.

HCl was subsequently added while stirring, and the pH value set to about 3.5.

After stirring for 30 minutes, a further 0.7% $SiO_2$ was added in the form of sodium silicate solution, and finally 2.0% $Al_2O_3$ in the form of sodium aluminate solution. A pH value of about 6 was obtained. The suspension was subsequently filtered, washed and dried. The dried material was micronized in a spiral jet mill with added silicone oil.

The composition of the $TiO_2$ pigment was analyzed with the help of XRF (X-ray fluorescence) and was 95% by weight $TiO_2$, 1.25% by weight $SiO_2$ and 3.3% by weight $Al_2O_3$. Examination under the transmission electron microscope revealed that the pigment displays a similarly homogeneous, smooth and continuous coating compared to Example 1. There is no flocculated coating material alongside the particles. The tinting strength (TS) of the pigment produced in this way was about 103 points.

Test Methods
Tinting Strength (TS)

The tinting strength (TS) of the pigments in the examples and the reference examples is determined after incorporation into a Vinnol black paste at a pigment volume concentration of 1.22% (so-called VIG method).

The titanium dioxide pigment to be tested is pasted with a ready-made Vinnol black paste on an automatic muller.

The grey paste obtained is applied to a chart with a film applicator. The reflectance values of the film are measured with a HunterLab PD-9000 calorimeter in wet state and referred to an internal standard.

Transmission Electron Microscopy (TEM)

The coating of the titanium dioxide particles can be visualized with the help of transmission electron microscopy (TEM).

The method according to the invention leads to pigments with a very homogeneous, smooth and continuous coating (FIG. 1). There is no flocculated coating material alongside the particles. The coating produced in accordance with the invention is thus substantially improved compared to that in Reference Example 1 (FIG. 2), produced by the classical method, and comparable to that in Reference Example 2, produced by the so-called TDD method. Significantly less time is required for coating inorganic solid particles e.g. with the silica employing the method according to the invention than the time required using the TDD method or classical method.

At the same time, however, the method according to the invention is characterized by the fact that the suspension displays similarly good filtration properties as in the classical method (Reference Example 1), whereas the suspension produced according to the TDD method (Reference Example 2) can, owing to thixotropy and formation of a very compact filter cake, only be filtered by reducing the throughput by about 30%.

The invention claimed is:

1. A method for coating inorganic solid particles, including titanium dioxide particles, in an aqueous suspension with at least one coating substance, comprising:
   a) disagglomeration of the solid particles contained in the aqueous suspension in a mill,
   b) adding a water-soluble precursor of the coating substance to the suspension,
   c) immediately following step b) homogenization of the suspension in a dispersing machine, to form a slurry where the temperature and pH value of the suspension do not change significantly in steps a) to c),
   d) feeding the slurry into a tank and precipitation of the coating substance onto the surface of the particles and,
   e) separating of the solid particles from the suspension.

2. The method of claim 1, wherein the coating substance includes at least one inorganic coating substance.

3. The method of claim 2, wherein the coating substance is selected from the group consisting of $SiO_2$ and $Al_2O_3$.

4. The method of claim 3, wherein $SiO_2$ is added in a quantity of about 0.1 to 5% by weight, referred to the particle mass.

5. The method of claim 1, wherein the mill used in step a) is an agitator mill.

6. The method of claim 1, wherein the suspension displays a pH value selected from the group consisting of about 9 to 12, and of about 2 to 5, in step a).

7. The method of claim 1, wherein the suspension displays a temperature of about 40 to 80° C. in step a).

8. The method of claim 1, wherein coarse material is removed from the suspension by a classification step after disagglomeration in step a).

9. The method of claim 1, wherein the precursor is added no later than eight hours after step a).

10. The method of claim 1, wherein the precursor is added no later than one hour, after step a).

11. The method of claim 1, wherein the precursor is added to a container selected from the group consisting of a tank and a pipeline in step b).

12. The method of claim 1, wherein an inline dispersing machine is used in step c).

13. The method of claim 12, wherein the inline dispersing machine is a rotor-stator system or a static mixer.

14. The method of claim 1, and further coating the surface of the particles with a coating selected from the group consisting of oxides, hydroxides, oxide hydrates and phosphates of Si, Al, Zr, Sn, Ti, Mn and Ce performed in step d.

15. The method of claim 14, wherein the further coating is performed with a quantity of about 0.5 to 8% by weight Al, calculated as $Al_2O_3$ and referred to the particle mass.

16. The method of claim 1 wherein the suspension displays a pH value of about 11 and the precursor is sodium silicate or sodium aluminate.

17. A method for coating titanium dioxide particles in an aqueous suspension with at least one coating substance, comprising:
   a) disagglomeration of the titanium dioxide particles contained in the aqueous suspension in a mill,
   b) adding a water-soluble precursor of $SiO_2$ to the suspension,
   c) immediately following step b) homogenization of the suspension in a dispersing machine, to form a slurry where the temperature and pH value of the suspension do not change significantly in steps a) to c),
   d) feeding the slurry into a tank and precipitation of the coating substance onto the surface of the particles, and
   e) separating the titanium dioxide particles from the suspension.

18. The method of claim 17 and further coating the surface of the particles with a coating of $Al_2O_3$ performed with a quantity of about 0.5 to 8% by weight Al, calculated as $Al_2O_3$ and referred to the particle mass.

* * * * *